United States Patent Office

2,851,481
Patented Sept. 9, 1958

2,851,481

PREPARATION OF MENTHENE ALCOHOLS

Robert L. Webb, Jacksonville, Fla., assignor to The Glidden Company, Cleveland, Ohio, a corporation of Ohio No Drawing. Application October 11, 1955
Serial No. 539,930

8 Claims. (Cl. 260—489)

It is the purpose of this invention to provide a method for treating 2,4(8)-p-menthadiene to obtain valuable terpene alcohols and esters which are useful intermediates for making thymol, carvacrol, pulegone, menthone, menthol and related compounds.

2,4(8)-p-menthadiene has been alluded to in the literature, see Simonsen, "The Terpenes," volume I, page 374 (second edition); O'Connor and Goldblatt, "Analytical Chemistry," volume 26, page 1726 (1954). It can be produced in a number of ways, but the simplest procedure for isolating it consists of fractionating monocyclic terpene fractions containing it in appreciable quantity. Such terpene fractions of monocyclic menthadienes result as by-products of treating terpenes under acid conditions. Such acid isomerization can be applied to turpentine, the individual pinenes, the non-conjugate menthadienes such as limonene and mixtures of these which tend to isomerize on boiling with aqueous sulfuric acid and the like to a mixture rich in conjugate menthadienes including α-terpinene and 2,4(8)-p-menthadiene, and usually containing also the more stable non-conjugate menthadienes, gamma-terpinene and terpinolene. 2,4(8)-p-menthadiene is also ordinarily present in the mixture of monocyclic terpenes resulting from catalytic processing the pinenes for camphene production and from other similar treatments wherein the acid-type catalysts are employed. In general, then, any of the commonly-occurring domestic terpenes can be heated with aqueous sulfuric acid, phosphoric acid and the like until a substantial amount of conjugate menthadienes is produced in the mixture, and from this mixture fractions rich in 2,4(8)-p-menthadiene present in the reacted mixture will vary over a wide range depending upon the raw material employed and the exact conditions of the acid isomerization. It is, however, possible to obtain 2,4(8)-p-menthadiene in concentrations as high as 10–30% in such acid isomerization mixtures, and that it can be isolated in a relatively pure condition by fractionation of such crude isomerized product.

Pure 2,4(8)-p-menthadiene boils at about 120° C. at 100 mm. pressure, and is accordingly found in the highest boiling fractions of monocyclic terpenes produced by the vigorous isomerization of the less highly acid treated or isomerized terpenes. When pure, I find it shows a refractive index of 1.4994 at 25° C., specific gravity 0.8627 at 15.5° C., and since it is a conjugated hydrocarbon diene, it possesses a strong characteristic ultraviolet spectrum and infrared spectrum which are very useful in identifying it and estimating its quantity in any fraction. For data concerning the spectra, see O'Connor and Goldblatt, ibid.

For the purpose of my invention, it does not need to be isolated in pure condition, although I prefer to employ it in fair purity in order to avoid unnecessary contamination of the final product. In general, it will be found to be perfectly economical to employ it in purity of, say, 70–95%, as such quality of product is readily obtained.

It is therefore an object to convert 2,4(8)-p-menthadiene to intermediates for synthesis of menthol and other flavor and perfume chemicals.

It is a further object to convert 2,4(8)-p-menthadiene to pulegol, 4(8)-menthene-3-ol.

It is a further object to convert 2,4(8)-p-menthadiene to paramenthene derivatives oxygenated at the 2-, 3- and 8-positions of the paramenthene skeleton.

It is an additional object of this invention to provide for a process for converting 2,4(8)-p-menthadiene-monohydrochloride to a mixture of carvenol, pulegol and 3-p-menthene-8-ol.

Another object is to provide a method for preparing allylic hydroxy-p-menthenes having hydroxy groups at the 2-, 3- or 8-positions.

Other objects will be apparent from the following description:

I have found that 2,4(8)-p-menthadiene-monohydrochloride can be readily produced by passing hydrogen chloride into the hydrocarbon in mole-for-mole ratio. The temperature employed is not critical, but at low temperatures it will be found that hydrogen chloride absorption is slow, and if very high temperatures are employed, some decomposition of the product may ensue. I find the temperatures within the range of about 0° to 70° C. are satisfactory, but since temperatures within the range of about 15 to 50° C. are convenient to maintain and are quite satisfactory, I prefer to operate within this range.

2,4(8)-p-menthadiene-monohydrochloride can also be prepared by mixing the terpene and concentrated hydrochloric acid with good agitation. In employing this method, I prefer to use a substantial excess of aqueous hydrochloric acid containing 30% or more hydrogen chloride, since I find that it is very difficult to produce the monohydrochloride in satisfactory yields when employing hydrochloric acid of strength less than 20% hydrogen chloride content. While this method is operable, I prefer to employ substantially anhydrous hydrogen chloride, since in this way higher conversions of hydrogen chloride to monohydrochloride are accomplished.

Having prepared 2,4(8)-p-menthadiene-monohydrochloride, I treat it with a base in the presence of water in order to remove the chlorine atom by hydrolysis and to replace it with a hydroxyl group. Thus, the chloride will be removed with the formation of alcohols if the reagent chosen is an alkali such as sodium or potassium hydroxide or any alkaline earth such as calcium hydroxide. The corresponding carbonates and bicarbonates can also be employed. I prefer to employ aqueous systems whereby the alkaline hydrolysis agent is dissolved in water, if it is soluble, or is suspended in water, if it is insoluble. Since calcium hydroxide and calcium carbonate are both cheap and effective, they are preferred. When sodium acetate, formate, or other carboxylic acid salt are employed in the hydrolysis step, some esters may result. No particular advantage results, however, from employment of these organic salts, whose main function is to neutralize the strong acid, hydrogen chloride, formed on hydrolysis.

The temperature employed in the hydrolysis step is not critical, but temperatures below about 10° or 20° C. are found to produce slower hydrolysis, and high temperatures, say, above 140° C. tend to result in undesirable decompositions. Temperatures of about 80° to 125° C. are satisfactory and convenient. If temperatures above these corresponding to the boiling point of water are to be employed, I prefer to use an autoclave.

The amount of alkaline substance used for hydrolysis is not critical, but I prefer to employ somewhat of an excess above that required for the neutralization of the hydrogen chloride set free on hydrolysis.

After substantial or complete hydrolysis has taken place, the oil layer is separated from the aqueous layer, and the oil layer is then separated into its constituent parts by fractional distillation in vacuo.

If fairly pure 2,4(8)-p-menthadiene is employed for the hydrochlorination followed by hydrolysis, the hydrocarbons will be found to consist mainly of 2,4-p-menthadiene; 3,8-p-menthadiene; and unchanged 2,4(8)-p-menthadiene. It is clear that the first two of these must arise through dehydrochlorination of the 2,4(8)-p-menthadiene-monohydrochloride or from dehydration of the alcohols produced on hydrolysis. We find that this mixture of recovered conjugate dienes can be recycled to the hydrochlorination stage of our process and that they are capable of yielding a mixture of the same alcohols as was obtained by treatment of the original pure 2,4(8)-p-menthadiene. The alcohol product obtained by reprocessing these recovered hydrocarbons is not derived entirely from the 2,4(8)-p-menthadiene content of the recovered hydrocarbons, but arises also from the 2,4-p-menthadiene and the 3,8-p-menthadiene content of the recycled hydrocarbons. This can be proved, if desired, by carefully fractionating the recovered hydrocarbons to obtain a fraction rich in 2,4-p-menthadiene and 3,8-p-menthadiene and containing no 2,4(8)-p-menthadiene. This product can be treated with hydrogen chloride and hydrolyzed to obtain a hydrolysate rich in 3-p-menthene-8-ol, carvenol and 4(8)-p-menthene-3-ol. Ordinarily, of course, I do not choose to refractionate the recovered hydrocarbons in this way, but prefer to add them to fresh 2,4(8)-p-menthadiene and process the mixture as such.

Upon very careful analysis of acid treated monocyclic terpenes which are highly isomerized and rich in conjugate menthadienes, it will be found that 2,4-p-menthadiene and 3,8-p-menthadiene are both present. The former ordinarily exists only to the extent of 1 or 2% at most, and the latter to the extent of, say, 3 to 7%, or more. It is therefore not economical to isolate these pure compounds from crude mixtures in which they exist to only such a small extent, but it is very practical to employ them for hydrochlorination if they are available easily, as they are from the hydrolysis of 2,4(8)-p-menthadiene-monohydrochloride. The invention, however, contemplates the use of 2,4-p-menthadiene and 3,8-p-menthadiene as equivalents of 2,4(8)-p-menthadiene. The chemical identity of 2,4(8)-p-menthadiene-monohydrochloride is not established, that is, it is not known whether it is a single compound or a mixture of allylic monochlorides. Neither is it known whether the addition of hydrogen chloride to 2,4-p-menthadiene and to 3,8-p-menthadiene yield individual compounds or whether there exists here only a mixture of allylic chlorides. In any case, the chlorides produced from these compounds do undergo solvolytic hydrolysis to produce the mixture of alcohols desired.

The alcohols produced consist largely of the compound 3-p-menthene-8-ol.

Smaller quantities of 3-p-menthene-2-ol, carvenol, and 4(8)-p-menthene-3-ol, pulegol, are also present in the hydrolysis mixture. These compounds are known, and it is known that they can be converted to carvomenthol and menthol, respectively, by hydrogenation. It is also known to oxidize these unsaturated alcohols with chromic acid, Beckmann mixture or the equivalent, to carvenone and pulegone, respectively. It is also known to selectively reduce these unsaturated ketones to carvomenthone and menthone, respectively. It is also known to dehydrogenate the unsaturated ketones to carvacrol and thymol, respectively. It is therefore apparent that the treatment of 2,4(8)-p-menthadiene according to the process of my invention results in useful intermediates for production of valuable p-menthane derivatives oxygenated at the 2- or 3-positions of the p-menthane skeleton.

However, a most important aspect of my invention is the production of the 3-menthene-8-ol coupled with the discovery that it is convertible to pulegol, its allylomer. It will be appreciated that the 3-p-menthene-8-ol does not yield menthol on hydrogenation and is therefore not useful for menthol production directly by hydrogenation. However, I find that this tertiary alcohol can be converted to esters of pulegol by treating it with carboxylic acids. Thus the 3-p-menthene-8-ol can be treated with formic acid, for example, to produce pulegyl formate in good yield, and this ester can be hydrogenated to menthyl formate or can be first saponified to pulegol and this alcohol then hydrogenated. There is formed on this acid treatment a little hydrocarbon rich in 3,8-p-methadiene, and this crude recovered hydrocarbon can, of course, be recycled to the hydrochlorination step of my process.

It is evident from the foregoing that 2,4(8)-p-menthadiene can be converted in good yield to menthol precursor when processed according to my invention. It will also be evident to those skilled in the art that it is not necessary to purify highly each compound involved in the treatment if menthol is to be produced, but that it suffices to make relatively simple separations of hydrocarbons from alcohols at the hydrolysis stage so that the hydrocarbons can be recycled to another hydrochlorination treatment and the alcohols isolated, or more simply, they can be esterified as a mixture to produce a mixture of the esters of pulegol and carvenol. Fractionation, hydrogenation and saponification, in either order, will follow to isolate the 2-hydroxy- and 3-hydroxy-p-menthane.

In general, the conversion of the 3-p-menthene-8-ol to pulegyl ester is accomplished by subjecting the alcohol to the action of hydrogen ions under esterifying conditions. Since the lower carboxylic acids are readily available at low cost and are fairly strong acids, they are convenient to use. But esterification using weak acids can be carried out, as is known, by the use of strong mineral acid salts, boron fluoride, etc., but I prefer to employ esterification conditions whereby such catalysts can be avoided. It is known that certain types of solvents affect the activity of acids considerably. Basic-type solvents, such as amines, ethyl ether, dioxane, cineole, etc. suppress the activity, whereas others increase the activity. Thus, where the acid used may be too active, its activity can be suppressed by choice of solvent, as well as by the use of buffers. Also the activity of any acid can be increased by solvents which increase acid activity.

In most cases it is preferred to employ an excess of carboxylic acid. The excess can be recycled to the process. Since water is formed in the reaction, the recycled acid may be reduced in strength unless the water is removed prior to recycling. Since the rate of reaction is increased at higher temperatures, it may be desirable to increase the temperature of the isomerization when using recycled or more dilute acids.

The following examples are illustrative:

EXAMPLE 1

500 grams of 2,4(8)-p-menthadiene, 85–90%, was hydrochlorinated by bubbling dry HCl into it at 15–25° C. When 105 grams of HCl had been absorbed, the hydrochlorination was stopped.

500 grams of the hydrochlorination product, 1000 grams of water and 300 grams of $CaCO_3$ were stirred at 90–105° C. for 18 hours. The mixture was then filtered to remove the excess $CaCO_3$. The oil layer was recovered and dried to yield 405 grams of hydrolisate. The hydrolisate was fractionated through an efficient column and the fractions analyzed by infrared spectroanalysis. The analysis showed that the hydrolisate was: 6–8% 2,4-p-menthadiene, B. P.$_{10\,mm.}$ 47–48° C.; 18–22% 3,8-p-menthadiene, B. P.$_{10\,mm.}$ 65–66° C.; 6–8% unchanged 2,4(8)-p-menthadiene; 45–50% 3-p-menthene-8-ol, B. P.$_{10\,mm.}$ 90–91° C.; 6–8% 3-p-menthene-2-ol. B. P.$_{10\,mm.}$ 100–101° C.; 6–8% 4(8)-p-menthene- 3-ol, B. P.$_{10\ mm.}$ 103–105° C.; and 7% higher boiling compounds.

Identification of compounds

Infrared spectroanalysis of the fraction boiling at 47–48° C. at 10 mm. indicated that it was a hydrocarbon containing a symmetrically disubstituted and a trisubstituted ethylenic bond as shown by the presence of the characteristic symmetrically disubstituted and trisubstituted ethylenic bonds absorptions at 13.7$\mu$ and 12.3$\mu$, respectively.

The ultraviolet spectrum of the hydrocarbon indicated that it was a conjugate diene having an absorption peak at 260m$\mu$ and an extinction coefficient $E_1\ _{cm.}^{g./1}$ of 31. Catalytic addition of one mole of hydrogen to the hydrocarbon in the presence of 0.2% by weight of PtO$_2$ at 25–35° C. under a hydrogen pressure of 40–60 p. s. i. g. gave a hydrogenation product containing 45% 2-p-menthene and 55% 3-p-menthene as determined by infrared spectroanalysis. From the above data it is evident that the hydrocarbon boiling at 47–48° C. at 10 mm. is 2,4-p-menthadiene.

Infrared spectroanalysis of the fraction boiling at 65–66° C. at 10 mm. indicated that it was a hydrocarbon having a disubstituted terminal methylene and a trisubstituted ethylenic bond as shown by the presence of the characteristic disubstituted terminal methylene and trisubstituted ethylenic bond absorptions at 11.3$\mu$ and 12.3$\mu$, respectively. The ultraviolet spectrum of the hydrocarbon indicated that it was a conjugated diene having an absorption peak at 234 m$\mu$. Catalytic addition of one mole of hydrogen to the hydrocarbon in the presence of 0.2% by weight of PtO$_2$ at 25–35° C. under a hydrogen pressure of 40–60 p. s. i. g. gave 3-p-menthene. From the above data it is evident that the hydrocarbon boiling at 65–66° C. at 10 mm. is 3,8-p-menthadiene.

Infrared spectroanalysis of the fraction boiling at 90–91° C. at 10 mm. pressure indicated that the compound was an unsaturated tertiary alcohol having a trisubstituted ethylenic bond as shown by the presence of the characteristic tertiary alcohol and trisubstituted ethylenic bond absorptions at 9.3$\mu$ and 12.3$\mu$, respectively. The alcohol was not $\alpha$-terpineol. Catalytic hydrogenation of the alcohol in the presence of 0.2% by weight of PtO$_2$ at 25–30° C. under a hydrogen pressure of 40–60 p. s. i. g. gave a saturated tertiary alcohol having an infrared spectrum identical with p-menthane-8-ol obtained by catalytic hydrogenation of $\alpha$-terpineol. From the above data, it is evident that the fraction boiling at 90–91° C. at 10 mm. is 3-p-menthene-8-ol. The allylomerization conducted as in Example 2 confirms the structure further.

The fraction boiling at 100–101° C. at 10 mm. was a secondary alcohol containing a trisubstituted ethylenic bond as shown by the presence of the characteristic secondary alcohol and trisubstituted ethylenic bond absorptions in the infrared spectrum at 10.4$\mu$ and 12.3$\mu$, respectively. The alcohol was not carvotanacetol. Catalytic hydrogenation followed by oxidation with NaCr$_2$O$_7$ and 50% aqueous H$_2$SO$_4$ gave carvomenthone, as determined by infrared spectroanalysis. From the above data, it is evident that the fraction boiling at 100–101° C. at 10 mm. is 3-p-menthene-2-ol, carvenol.

Infrared spectroanalysis of the fraction boiling at 103–105° C. at 10 mm. indicated that it was an unsaturated secondary alcohol having a tetrasubstituted ethylenic bond as shown by the characteristic tetrasubstituted ethylenic bond and secondary alcohol absorptions at 9.3$\mu$ and 10.4$\mu$, respectively. Catalytic hydrogenation of the alcohol in the presence of 0.2% by weight of PtO$_2$ at 25° C. under a hydrogen pressure of 500 p. s. i. g. gave a mixture of menthols. From the above data, it is evident that the fraction boiling at 103–105° C. is 4(8)-p-menthene-3-ol, pulegol.

EXAMPLE 2

50 grams of 3-p-methene-8-ol was slowly added to a mixture of 50 grams of 90% formic acid and 7.5 grams of anhydrous sodium acetate at about 0° C., and the mixture was stirred at 0–5° C. for four hours. The oil layer was then recovered and saponified using an excess of a 25% NaOH solution. Infrared spectroanalysis of the saponification product showed that it was 15–20% hydrocarbon consisting largely of 3,8-p-methadiene and 80–85% 4(8)-p-menthene-3-ol identical with that produced in Example 1.

EXAMPLE 3

A sample of recovered hydrocarbons, 100 grams, from alkaline hydrolysis of 2,4(8)-p-menthadiene-monohydrochloride and rich in 3,8-p-menthadiene is treated with 30 grams dry hydrogen chloride at about 30° C. The crude hydrochloride product is then agitated with 500 ml. water and the mixture cooled to 0° C. A solution of 50 grams sodium hydroxide in 200 ml. water is then added dropwise over the period of about one hour while stirring the mixture vigorously and maintaining the temperature at 0° to 10° C. After all the alkali had been added, the mixture is allowed to warm with stirring to room temperature and then heated to 100° C. over a period of about two hours. It is then cooled and separated to yield an oil phase rich in alcohols. The oil upon fractionation yields 40 grams of a hydrocarbon fraction rich in 3,8-p-methadiene and 50 grams of an alcohol mixture rich in 3-menthene-8-ol.

Having described the invention, what is claimed is:

1. The process which comprises reacting a terpene hydrocarbon selected from the class consisting of 2,4(8)-p-menthadiene, 3,8-p-menthadiene, 2,4-p-menthadiene, and mixtures thereof with an equimolecular quantity of HCl to form the menthadiene-monohydrochloride, and hydrolyzing the resulting menthadiene-monohydrochloride in the presence of water and a base in an amount at least sufficient to substantially neutralize the HCl formed on hydrolysis.

2. The process which comprises reacting a terpene hydrocarbon selected from the class consisting of 2,4(8)-p-menthadiene, 3,8-p-menthadiene, 2,4-p-menthadiene, and mixtures thereof with an equimolecular quantity of HCl to form the menthadiene-monohydrochloride, hydrolyzing the resulting menthadiene-monohydrochloride in the presence of water and a base in an amount at least sufficient to substantially neutralize the HCl formed on hydrolysis and reacting the 3-p-menthene-8-ol formed on hydrolysis with a lower alkanoic acid under conditions conducive to allylic rearrangement to form a pulegyl ester.

3. The process which comprises reacting 2,4(8)-p-menthadiene with an equimolecular quantity of HCl to form the menthadiene-monohydrochloride, and hydrolyzing the resulting 2,4(8)-p-menthadiene-monohydrochloride in the presence of water and a base in an amount at least sufficient to substantially neutralize the HCl formed on hydrolysis.

4. The process which comprises reacting 2,4(8)-p-menthadiene with an equimolecular quantity of HCl to form the menthadiene-monohydrochloride, hydrolyzing the resulting 2,4(8)-p-menthadiene-monochloride in the presence of water and at least sufficient base to substantially neutralize the HCl formed on hydrolysis, fractionating the hydrolysis mixture to separate a hydrocarbon fraction from the alcohols formed on hydrolysis and adding the recovered hydrocarbons to additional 2,4(8)-p-menthadiene for hydrochlorination and further use in the process.

5. The process which comprises reacting 2,4(8)-p-menthadiene with an equimolecular quantity of HCl to form the menthadiene-monohydrochloride, hydrolyzing the resulting 2,4(8)-p-menthadiene-monohydrochloride in the presence of water and at least sufficient base to substantially neutralize the HCl formed on hydrolysis, fractionating the hydrolysis mixture to recover a hydrocarbon fraction and a fraction rich in 3-p-menthene-8-ol, reacting the recovered 3-p-menthene-8-ol with a lower alkanoic acid under conditions conducive to allylic rearrangement to form a pulegyl ester, and adding the recovered hydrocarbons to additional 2,4(8)-p-menthadiene for hydrochlorination and further use in the process.

6. The process which comprises reacting 3-p-menthene-8-ol with a lower alkanoic acid under conditions conducive to allylic rearrangement whereby a pulegyl ester is formed.

7. The process comprising reacting a terpene hydrocarbon selected from the class consisting of 2,4(8)-p-menthadiene, 3,8-p-menthadiene, 2,4-p-menthadiene and mixtures thereof with an equimolecular quantity of HCl to form the menthadiene monohydrochloride, hydrolyzing the resulting menthadiene hydrochloride with water in the presence of a base in an amount at least sufficient to substantially neutralize the HCl formed on hydrolysis, reacting the 3-p-menthene-8-ol formed on hydrolysis with a lower alkanoic acid under conditions conducive to allylic rearrangement and saponifying the product thus formed to produce pulegol.

8. The process comprising reacting a terpene hydrocarbon selected from the class consisting of 2,4(8)-p-menthadiene, 3,8-p-menthadiene, 2,4-p-menthadiene and mixtures thereof with an equimolecular quantity of HCl to form the menthadiene monohydrochloride, hydrolyzing the resulting menthadiene hydrochloride with water in the presence of a base in an amount at least sufficient to substantially neutralize the HCl formed on hydrolysis, reacting the 3-p-menthene-8-ol formed on hydrolysis with formic acid buffered with a salt of a lower alkanoic acid to form pulegyl formate.

References Cited in the file of this patent

UNITED STATES PATENTS 2,609,388    Knapp et al. _____ Sept. 2, 1952

FOREIGN PATENTS 532,614    Great Britain _____ Jan. 28, 1941

OTHER REFERENCES

Simonsen et al.: "The Terpenes," vol. 1 (1953), page 374.